(12) United States Patent
Holbrook et al.

(10) Patent No.: US 8,312,103 B2
(45) Date of Patent: Nov. 13, 2012

(54) PERIODIC BALANCED COMMUNICATION NODE AND SERVER ASSIGNMENT

(75) Inventors: Kenneth J. Holbrook, Cary, NC (US); Christopher M. Higgins, Wake Forest, NC (US)

(73) Assignee: Itron, Inc., Liberty Lake, WA (US)

( * ) Notice: Subject to any disclaimer, the term of this patent is extended or adjusted under 35 U.S.C. 154(b) by 1076 days.

(21) Appl. No.: 11/897,235

(22) Filed: Aug. 29, 2007

(65) Prior Publication Data

US 2008/0071911 A1 Mar. 20, 2008

Related U.S. Application Data

(60) Provisional application No. 60/841,631, filed on Aug. 31, 2006.

(51) Int. Cl.
*G06F 15/16* (2006.01)

(52) U.S. Cl. ......... 709/217; 709/226; 709/224; 709/231

(58) Field of Classification Search .................. 709/201, 709/203, 213, 223, 217, 226, 224, 231
See application file for complete search history.

(56) References Cited

U.S. PATENT DOCUMENTS

| | | | |
|---|---|---|---|
| 4,799,062 A | 1/1989 | Sanderford, Jr. et al. |
| 4,977,577 A | 12/1990 | Arthur et al. |
| 4,998,102 A | 3/1991 | Wyler et al. |
| 5,067,136 A | 11/1991 | Arthur et al. |
| 5,095,493 A | 3/1992 | Arthur et al. |
| 5,119,396 A | 6/1992 | Snderford, Jr. |
| 5,198,796 A | 3/1993 | Hessling, Jr. |
| 5,265,120 A | 11/1993 | Sanderford, Jr. |
| 5,310,075 A | 5/1994 | Wyler |
| 5,311,541 A | 5/1994 | Sanderford, Jr. |
| 5,377,222 A | 12/1994 | Sanderford, Jr. |
| 5,377,232 A | 12/1994 | Davidov et al. |
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |
| 5,661,750 A | 8/1997 | Fulton |
| 5,668,828 A | 9/1997 | Sanderford, Jr. et al. |
| 5,696,441 A | 12/1997 | Mak et al. |
| 5,714,931 A | 2/1998 | Petite et al. |
| RE35,829 E | 6/1998 | Sanderford, Jr. |
| 5,801,643 A | 9/1998 | Williams et al. |
| 5,892,758 A | 4/1999 | Argyroudis |
| 5,920,589 A | 7/1999 | Rouquette et al. |

(Continued)

OTHER PUBLICATIONS

Jennifer Hicks, "Software helps users manage automation assets", PAS, Inc., Jul. 18, 2006.

(Continued)

*Primary Examiner* — Djenane Bayard
(74) *Attorney, Agent, or Firm* — Dority & Manning, P.A.

(57) ABSTRACT

Disclosed are apparatus and methodology subject matters for controlling the allocation of system nodes to a variable number of communication servers in an Advanced Metering System (AMS). An Orchestration Manager is provided through which all requests for end-device communications are routed. The Orchestration Manager periodically rebalances node assignments to reallocate nodes among communication servers in order to maintain data collection efficiency and in order to redistribute end devices from a failed communication server, or to otherwise adjust for the addition of a newly activated communication server.

16 Claims, 2 Drawing Sheets

U.S. PATENT DOCUMENTS

| | | |
|---|---|---|
| 5,926,531 A | 7/1999 | Petite |
| 5,933,072 A | 8/1999 | Kelley |
| 5,953,368 A | 9/1999 | Sanderford et al. |
| 5,963,650 A | 10/1999 | Simionescu et al. |
| 5,987,058 A | 11/1999 | Sanderford et al. |
| 6,028,522 A | 2/2000 | Petite |
| 6,031,883 A | 2/2000 | Sanderford, Jr. et al. |
| 6,044,062 A | 3/2000 | Brownrigg et al. |
| 6,047,016 A | 4/2000 | Ramberg et al. |
| 6,069,571 A | 5/2000 | Tell |
| 6,088,659 A * | 7/2000 | Kelley et al. .................. 702/62 |
| 6,100,816 A | 8/2000 | Moore |
| 6,163,276 A | 12/2000 | Irving et al. |
| 6,178,197 B1 | 1/2001 | Froelich et al. |
| 6,181,258 B1 | 1/2001 | Summers et al. |
| 6,195,018 B1 | 2/2001 | Ragle et al. |
| 6,218,953 B1 | 4/2001 | Petite |
| 6,232,885 B1 | 5/2001 | Ridenour et al. |
| 6,233,327 B1 | 5/2001 | Petite |
| 6,246,677 B1 | 6/2001 | Nap et al. |
| 6,249,516 B1 | 6/2001 | Brownrigg et al. |
| 6,263,009 B1 | 7/2001 | Ramberg et al. |
| 6,335,953 B1 | 1/2002 | Sanderford, Jr. et al. |
| 6,363,057 B1 | 3/2002 | Ardalan et al. |
| 6,369,769 B1 | 4/2002 | Nap et al. |
| 6,377,609 B1 | 4/2002 | Brennan, Jr. |
| 6,396,839 B1 | 5/2002 | Ardalan et al. |
| 6,424,270 B1 | 7/2002 | Ali |
| 6,426,027 B1 | 7/2002 | Scarborough, III et al. |
| 6,430,268 B1 | 8/2002 | Petite |
| 6,437,692 B1 | 8/2002 | Petite et al. |
| 6,452,986 B1 | 9/2002 | Luxford et al. |
| 6,456,644 B1 | 9/2002 | Ramberg et al. |
| 6,538,577 B1 | 3/2003 | Ehrke et al. |
| 6,604,434 B1 | 8/2003 | Hamilton et al. |
| 6,611,134 B2 | 8/2003 | Chung |
| 6,612,188 B2 | 9/2003 | Hamilton |
| 6,617,879 B1 | 9/2003 | Chung |
| 6,617,976 B2 | 9/2003 | Walden et al. |
| 6,617,978 B2 | 9/2003 | Ridenour et al. |
| 6,618,578 B1 | 9/2003 | Petite |
| 6,618,709 B1 | 9/2003 | Sneeringer |
| 6,626,048 B1 | 9/2003 | Dam Es et al. |
| 6,628,764 B1 | 9/2003 | Petite |
| 6,639,939 B1 | 10/2003 | Naden et al. |
| 6,650,249 B2 | 11/2003 | Meyer et al. |
| 6,657,552 B2 | 12/2003 | Belski et al. |
| 6,671,586 B2 | 12/2003 | David et al. |
| 6,684,245 B1 * | 1/2004 | Shuey et al. .................. 709/223 |
| 6,700,902 B1 | 3/2004 | Meyer |
| 6,704,301 B2 | 3/2004 | Chari et al. |
| 6,721,872 B1 | 4/2004 | Dunlop et al. |
| 6,734,663 B2 | 5/2004 | Fye et al. |
| 6,747,557 B1 | 6/2004 | Petite et al. |
| 6,747,571 B2 | 6/2004 | Fierro et al. |
| 6,747,981 B2 | 6/2004 | Ardalan et al. |
| 6,778,099 B1 | 8/2004 | Meyer et al. |
| 6,784,807 B2 | 8/2004 | Petite et al. |
| 6,792,337 B2 | 9/2004 | Blackett et al. |
| 6,816,538 B2 | 11/2004 | Shuey et al. |
| 6,836,108 B1 | 12/2004 | Balko et al. |
| 6,836,737 B2 | 12/2004 | Petite et al. |
| 6,850,197 B2 | 2/2005 | Paun |
| 6,859,186 B2 | 2/2005 | Lizalek et al. |
| 6,862,498 B2 | 3/2005 | David et al. |
| 6,867,707 B1 | 3/2005 | Kelley et al. |
| 6,885,309 B1 | 4/2005 | Van Heteren |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,918,311 B2 | 7/2005 | Nathan |
| 6,931,445 B2 | 8/2005 | Davis |
| 6,933,857 B2 | 8/2005 | Foote |
| 6,940,396 B2 | 9/2005 | Hammond et al. |
| 6,965,575 B2 | 11/2005 | Srikrishna et al. |
| 6,972,555 B2 | 12/2005 | Balko et al. |
| 6,982,651 B2 | 1/2006 | Fischer |
| 6,999,008 B2 | 2/2006 | Wang et al. |
| 7,019,667 B2 | 3/2006 | Petite et al. |
| 7,039,916 B2 | 5/2006 | Jason, Jr. |
| 7,046,682 B2 | 5/2006 | Carpenter et al. |
| 7,053,767 B2 | 5/2006 | Petite et al. |
| 7,054,271 B2 | 5/2006 | Brownrigg et al. |
| 7,079,810 B2 | 7/2006 | Petite et al. |
| 7,089,281 B1 | 8/2006 | Kazemi et al. |
| 7,093,033 B2 | 8/2006 | Beckett et al. |
| 7,103,016 B1 | 9/2006 | Duffy et al. |
| 7,103,511 B2 | 9/2006 | Petite |
| 7,119,713 B2 | 10/2006 | Shuey et al. |
| 7,126,494 B2 | 10/2006 | Ardalan et al. |
| 7,137,550 B1 | 11/2006 | Petite |
| 7,184,861 B2 | 2/2007 | Petite |
| 7,209,466 B2 | 4/2007 | Cabana |
| 7,209,840 B2 | 4/2007 | Petite et al. |
| 7,233,830 B1 | 6/2007 | Callaghan et al. |
| 7,263,073 B2 | 8/2007 | Petite et al. |
| 7,272,834 B2 | 9/2007 | Bauman et al. |
| 7,295,128 B2 | 11/2007 | Petite |
| 7,337,191 B2 | 2/2008 | Haeberle et al. |
| 7,346,463 B2 | 3/2008 | Petite et al. |
| 7,379,981 B2 | 5/2008 | Elliott et al. |
| 7,397,907 B2 | 7/2008 | Petite |
| 7,424,527 B2 | 9/2008 | Petite |
| 7,447,220 B2 | 11/2008 | Lu et al. |
| 7,467,065 B2 | 12/2008 | Neel et al. |
| 7,468,661 B2 | 12/2008 | Petite et al. |
| 7,480,501 B2 | 1/2009 | Petite |
| 7,602,782 B2 | 10/2009 | Doviak et al. |
| 7,650,425 B2 | 1/2010 | Davis et al. |
| 7,697,492 B2 | 4/2010 | Petite |
| 7,702,779 B1 * | 4/2010 | Gupta et al. .................. 709/224 |
| 7,965,758 B2 | 6/2011 | Picard |
| 2001/0010032 A1 | 7/2001 | Ehlers et al. |
| 2001/0032232 A1 | 10/2001 | Zombek et al. |
| 2002/0019725 A1 | 2/2002 | Petite |
| 2002/0146985 A1 | 10/2002 | Naden |
| 2002/0169643 A1 | 11/2002 | Petite et al. |
| 2003/0014544 A1 | 1/2003 | Pettey |
| 2003/0036810 A1 | 2/2003 | Petite |
| 2003/0048199 A1 | 3/2003 | Zigdon et al. |
| 2003/0063723 A1 | 4/2003 | Booth et al. |
| 2003/0078029 A1 | 4/2003 | Petite |
| 2003/0093484 A1 | 5/2003 | Petite |
| 2003/0103486 A1 | 6/2003 | Salt et al. |
| 2003/0179149 A1 | 9/2003 | Savage et al. |
| 2004/0004555 A1 | 1/2004 | Martin |
| 2004/0008663 A1 | 1/2004 | Srikrishna et al. |
| 2004/0040368 A1 | 3/2004 | Guckenberger et al. |
| 2004/0053639 A1 | 3/2004 | Petite et al. |
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0091122 A1 | 5/2004 | Bavholm et al. |
| 2004/0113812 A1 * | 6/2004 | Mason et al. ............ 340/870.02 |
| 2004/0117330 A1 | 6/2004 | Ehlers et al. |
| 2004/0131125 A1 | 7/2004 | Sanderford, Jr. et al. |
| 2004/0133314 A1 | 7/2004 | Ehlers et al. |
| 2004/0138981 A1 | 7/2004 | Ehlers et al. |
| 2004/0139038 A1 | 7/2004 | Ehlers et al. |
| 2004/0183687 A1 | 9/2004 | Petite et al. |
| 2004/0192415 A1 | 9/2004 | Luglio et al. |
| 2004/0218616 A1 | 11/2004 | Ardalan et al. |
| 2004/0264379 A1 | 12/2004 | Srikrishna et al. |
| 2004/0264435 A1 | 12/2004 | Chari et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0065742 A1 | 3/2005 | Rodgers |
| 2005/0068970 A1 | 3/2005 | Srikrishna et al. |
| 2005/0074015 A1 | 4/2005 | Chari et al. |
| 2005/0129005 A1 | 6/2005 | Srikrishna et al. |

| | | |
|---|---|---|
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0243867 A1 | 11/2005 | Petite |
| 2005/0251401 A1 | 11/2005 | Shuey |
| 2005/0251403 A1 | 11/2005 | Shuey |
| 2005/0271006 A1 | 12/2005 | Chari et al. |
| 2005/0278440 A1* | 12/2005 | Scoggins ............... 709/223 |
| 2006/0002350 A1 | 1/2006 | Behroozi |
| 2006/0012935 A1 | 1/2006 | Murphy |
| 2006/0015945 A1 | 1/2006 | Fields |
| 2006/0018303 A1 | 1/2006 | Sugiarto et al. |
| 2006/0038548 A1 | 2/2006 | Shuey |
| 2006/0043961 A1 | 3/2006 | Loy |
| 2006/0071810 A1 | 4/2006 | Scoggins et al. |
| 2006/0071812 A1 | 4/2006 | Mason, Jr. et al. |
| 2006/0098576 A1 | 5/2006 | Brownrigg et al. |
| 2006/0136583 A1 | 6/2006 | Helmstetter et al. |
| 2006/0184667 A1 | 8/2006 | Clubb et al. |
| 2007/0135973 A1 | 6/2007 | Petite |
| 2007/0214232 A1 | 9/2007 | Belimpasakis et al. |
| 2007/0241739 A1 | 10/2007 | Uenou et al. |
| 2007/0283001 A1 | 12/2007 | Spiess et al. |
| 2008/0074285 A1 | 3/2008 | Guthrie |
| 2008/0150750 A1 | 6/2008 | Parris et al. |
| 2008/0186898 A1 | 8/2008 | Petite |
| 2009/0068947 A1 | 3/2009 | Petite |
| 2009/0146839 A1 | 6/2009 | Reddy et al. |
| 2010/0045447 A1* | 2/2010 | Mollenkopf et al. .... 340/310.11 |

OTHER PUBLICATIONS

"Software provides managed environment for information", Bentley Systems Inc., Jul. 18, 2006.
International Search Report for PCT International Application No. PCT/US07/19047 dated Sep. 9, 2008.
Reissued Patent No. Re. 35,829 entitled Binary Phase Shift Keying Modulation System and/or Frequency Multiplier by Sanderford, Jr., Reissued Date of patent: Jun. 23, 1998.
National Electrical Manufacturers Association, "Protocol Specification for Interfacing to Data Communication Networks", ANSI Std. C12.22-199x, Sep. 30, 1999.
Gyozo Kmethy, "Meter data exchange—standardization for interoperability", Hungarian Institute of Standards, Metering International, Issue 3 2000.
Ted York, "Exploring ANSI Standards in Meter Communications", *Electricity Today*, Sep. 2000.
Keith Martin, "Beware of Standards that Speak with Forked Tongue", *Energy Pulse*, Jan. 2006.
Mark Michaelis, *Essential C# 2.0*, Jul. 2006.
UtiliPoint International Inc., IssueAlert, "Open Protocols for AMI Open Door to Flexibility and Innovation", Jul. 26, 2006.
National Electrical Manufacturers Association, "Protocol Specification for Interfacing to Data Communication Networks", ANSI Std. C12.22-200x, Aug. 21, 2006.
International Search Report for PCT International Application No. PCT/US07/19043 dated Jul. 29, 2008.
International Search Report for PCT International Application No. PCT/US07/19051 issued Sep. 16, 2008.
Office Action for U.S. Appl. No. 11/897,233 mailed Nov. 9, 2009.
International Search Report for PCT International Application No. PCT/US2011/030239, completed May 18, 2011, mailed May 31, 2011.
Written Opinion of the International Searching Authority for PCT International Application No. PCT/US2011/030239 completed May 18, 2011, mailed May 31, 2011.

\* cited by examiner

PERIODIC BALANCED COMMUNICATION NODE AND SERVER ASSIGNMENT

PRIORITY CLAIM

This application claims the benefit of previously filed U.S. Provisional Patent Application entitled "ORCHESTRATION MANAGER," assigned U.S. Ser. No. 60/841,631, filed Aug. 31, 2006, and which is hereby incorporated herein by reference in its entirety for all purposes.

FIELD OF THE INVENTION

The present technology generally relates to utility meters. More particularly, in the context of advanced metering infrastructure, the present technology in pertinent part relates to apparatus and methodologies for controlling the allocation of system nodes to a variable number of communication servers to provide system scalability and redundancy.

BACKGROUND OF THE INVENTION

The general object of metrology is to monitor one or more selected physical phenomena to permit a record of monitored events. Such basic purpose of metrology can be applied to a variety of metering devices used in a number of contexts. One broad area of measurement relates, for example, to utility meters. Such role may also specifically include, in such context, the monitoring of the consumption or production of a variety of forms of energy or other commodities, for example, including but not limited to, electricity, water, gas, or oil.

More particularly concerning electricity meters, mechanical forms of registers have been historically used for outputting accumulated electricity consumption data. Such an approach provided a relatively dependable field device, especially for the basic or relatively lower level task of simply monitoring accumulated kilowatt-hour consumption.

The foregoing basic mechanical form of register was typically limited in its mode of output, so that only a very basic or lower level metrology function was achieved. Subsequently, electronic forms of metrology devices began to be introduced, to permit relatively higher levels of monitoring, involving different forms and modes of data.

In the context of electricity meters specifically, for a variety of management and billing purposes, it became desirable to obtain usage data beyond the basic kilowatt-hour consumption readings available with many electricity meters. For example, additional desired data included rate of electricity consumption, or date and time of consumption (so-called "time of use" data). Solid state devices provided on printed circuit boards, for example, utilizing programmable integrated circuit components, have provided effective tools for implementing many of such higher level monitoring functions desired in the electricity meter context.

In addition to the beneficial introduction of electronic forms of metrology, a variety of electronic registers have been introduced with certain advantages. Still further, other forms of data output have been introduced and are beneficial for certain applications, including wired transmissions, data output via radio frequency transmission, pulse output of data, and telephone line connection via such as modems or cellular linkups.

The advent of such variety and alternatives has often required utility companies to make choices about which technologies to utilize. Such choices have from time to time been made based on philosophical points and preferences and/or based on practical points such as, training and familiarity of field personnel with specific designs.

Another aspect of the progression of technology in such area of metrology is that various retrofit arrangements have been instituted. For example, some attempts have been made to provide basic metering devices with selected more advanced features without having to completely change or replace the basic meter in the field. For example, attempts have been made to outfit a basically mechanical metering device with electronic output of data, such as for facilitating radio telemetry linkages.

Another aspect of the electricity meter industry is that utility companies have large-scale requirements, sometimes involving literally millions of individual meter installations, or data points. Implementing incremental changes in technology, such as retrofitting new features into existing equipment, or attempting to implement changes to basic components which make various components not interchangeable with other configurations already in the field, can generate considerable industry problems.

Electricity meters typically include input circuitry for receiving voltage and current signals at the electrical service. Input circuitry of whatever type or specific design for receiving the electrical service current signals is referred to herein generally as current acquisition circuitry, while input circuitry of whatever type or design for receiving the electrical service voltage signals is referred to herein generally as voltage acquisition circuitry.

Electricity meter input circuitry may be provided with capabilities of monitoring one or more phases, depending on whether monitoring is to be provided in a single or multiphase environment. Moreover, it is desirable that selectively configurable circuitry may be provided so as to enable the provision of new, alternative or upgraded services or processing capabilities within an existing metering device. Such variations in desired monitoring environments or capabilities, however, lead to the requirement that a number of different metrology configurations be devised to accommodate the number of phases required or desired to be monitored or to provide alternative, additional or upgraded processing capability within a utility meter.

More recently a new ANSI protocol, ANSI C12.22, is being developed that may be used to permit open protocol communications among metrology devices from various manufacturers. C12.22 is the designation of the latest subclass of the ANSI C12.xx family of Meter Communication and Data standards presently under development. Presently defined standards include ANSI C12.18 relating to protocol specifications for Type 2 optical ports; ANSI C12.19 relating to Utility industry Meter Data Table definitions; and ANSI C12.21 relating to Plain Old Telephone Service (POTS) transport of C12.19 Data Tables definition. It should be appreciated that while the remainder of the present discussion may describe C12.22 as a standard protocol, that, at least at the time of filing the present application, such protocol is still being developed so that the present disclosure is actually intended to describe an open protocol that may be used as a communications protocol for networked metrology and is referred to for discussion purposes as the C12.22 standard or C12.22 protocol.

C12.22 is an application layer protocol which provides for the transport of C12.19 data tables over any network medium. Current standards for the C12.22 protocol include: authentication and encryption features; addressing methodology providing unique identifiers for corporate, communication, and end device entities; self describing data models; and message routing over heterogeneous networks.

Much as HTTP protocol provides for a common application layer for web browsers, C12.22 provides for a common application layer for metering devices. Benefits of using such a standard include the provision of: a methodology for both session and session-less communications; common data encryption and security; a common addressing mechanism for use over both proprietary and non-proprietary network mediums; interoperability among metering devices within a common communication environment; system integration with third-party devices through common interfaces and gateway abstraction; both 2-way and 1-way communications with end devices; and enhanced security, reliability and speed for transferring meter data over heterogeneous networks.

To understand why utilities are keenly interested in open protocol communications; consider the process and ease of sending e-mails from a laptop computer or a smart phone. Internet providers depend on the use of open protocols to provide e-mail service. E-mails are sent and received as long as e-mail addresses are valid, mail boxes are not full, and communication paths are functional. Most e-mail users have the option of choosing among several internet providers and several technologies, from dial-up to cellular to broadband, depending mostly on the cost, speed, and mobility. The e-mail addresses are in a common format, and the protocols call for the e-mail to be carried by communication carriers without changing the e-mail. The open protocol laid out in the ANSI C.12.22 standard provides the same opportunity for meter communications over networks.

In addition, the desire for increased processing capabilities as well as other considerations including, but not limited to, a desire to provide scalability and redundancy, leads to requirements for supplying adequate communications capabilities to a significant number of meters that may be installed over a significant area often encompassing many square miles, such as in an advanced metering infrastructure environment.

As such, it is desired to provide relatively more universal metrology technology and associated methodologies that permit scalability and redundancy within metrology systems, including those subsisting in, as part of, or functional with, an advanced metering infrastructure environment.

While various aspects and alternative embodiments may be known in the field of utility metering, no one design has emerged that generally encompasses the above-referenced characteristics and other desirable features associated with utility metering technology as herein presented.

SUMMARY OF THE INVENTION

In view of the recognized features encountered in the prior art and addressed by the present subject matter, improved apparatus and methodologies for controlling the allocation of system or network nodes to a variable number of communication servers, such as to advantageously provide system scalability and redundancy, have been provided.

In exemplary arrangements, apparatus and methodologies are provided to permit load balancing from within a Collection Engine.

In one of its simpler forms, the present technology provides for periodic rebalancing of server loads to optimize data collection.

One positive aspect of such present rebalancing is that it improves opportunities to contact end devices and to read data from such end devices.

Another positive aspect of such present rebalancing is that it advantageously improves opportunities to receive exception reports from end devices.

Present exemplary subject matter relates to an orchestration manager for distributing utility meter data communications functionality across multiple servers. Such an exemplary orchestration manager preferably may comprise a master relay configured to register and authenticate multiple communication nodes associated with one or more respective utility meters and to assign communication functionality associated with such multiple communication nodes to a plurality of communication servers; and a plurality of communication servers configured to communicate with at least a selected portion of such multiple communication nodes, with each communication server configured to send and receive network communications and to acquire meter data from such multiple communications nodes.

In various present alternatives of such exemplary orchestration manager subject matter, each such communication server may preferably comprise a meter communications host configured to send and receive network communications; a data spooler configured to receive meter data from respective utility meters associated with a communication node; and an exception event manager configured to receive exception events from respective utility meters associated with a communication node.

In still further present alternatives, such meter communications host may be configured to communicate in accordance with an open standard meter communication protocol.

In additional present alternatives, such master relay may be configured to periodically assign communication functionality associated with such multiple communication nodes to such plurality of communication servers, so as to periodically effect load rebalancing among said plurality of communication servers, and further configured to redistribute communication nodes from a failed communication server to an active one of such plurality of communication servers; and to copy to another location state information for the one or more respective meters associated with respective communication nodes previously communicating with a failed communication server.

Another present exemplary embodiment relates to an advanced metering system for controlling allocation of network nodes in a utility metering environment to a variable number of servers, so as to effect efficient utility meter data communications. Such advanced metering system preferably may include a plurality of end devices, at least some of which end devices comprise metrology devices; and a network including a central facility having a collection engine including an orchestration manager for distributing metrology device data communications functionality across multiple servers.

In various alternatives of such advanced metering system, such a system may include multiple communication nodes associated with one or more respective utility meters, which may include at least one communication node operating on a radio network and at least one communication node operating on a power line communications (PLC) network.

It is to be understood that other present exemplary embodiments equally relate to various methodologies, with one such present example relating to a method of controlling allocation of network nodes in a utility metering environment to a variable number of servers, so as to effect efficient utility meter data communications. Such an exemplary present method more particularly may include the steps of: identifying a plurality of communication nodes, each communication node being associated with one or more respective utility meters; assigning to respective selected servers communication functionality associated with respective selected portions of the plurality of communication nodes; and effecting two-way communication between each selected portion of the plurality of communication nodes and its respective assigned server, wherein such two-way communication is conducted in accordance with an open standard meter communication protocol.

Other present exemplary methodologies may include the foregoing, and further comprise a step of receiving meter data from respective utility meters associated with each communication node, a step of receiving exception event data from respective utility meters associated with each communication node, and upon receiving exception event data indicating failure of one or more of the servers, redistributing communication nodes from being assigned to a failed server to being assigned to an active one of the plurality of servers.

Still other present exemplary methodologies and various present alternatives may involve a step of copying to another location state information for the one or more respective meters associated with respective communication nodes previously communicating with a failed server; practicing the above-referenced assigning step on a periodic basis, so as to effect periodic load rebalancing among the plurality of servers; or conducting a further step of tracking actions currently in progress on the plurality of servers; or a step of registering and authenticating each of the plurality of communication nodes.

Yet another positive aspect of the present subject matter is that present rebalancing features also redistribute end devices from failed communications servers to other active servers and to newly activated servers. In pertinent part in such aspects, the present technology (particularly when implemented in an "Orchestration Manager" type arrangement) also advantageously functions as an ANSI standard C12.22 Notification Host as it operates to coordinate registration related processing on communications servers.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of such subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
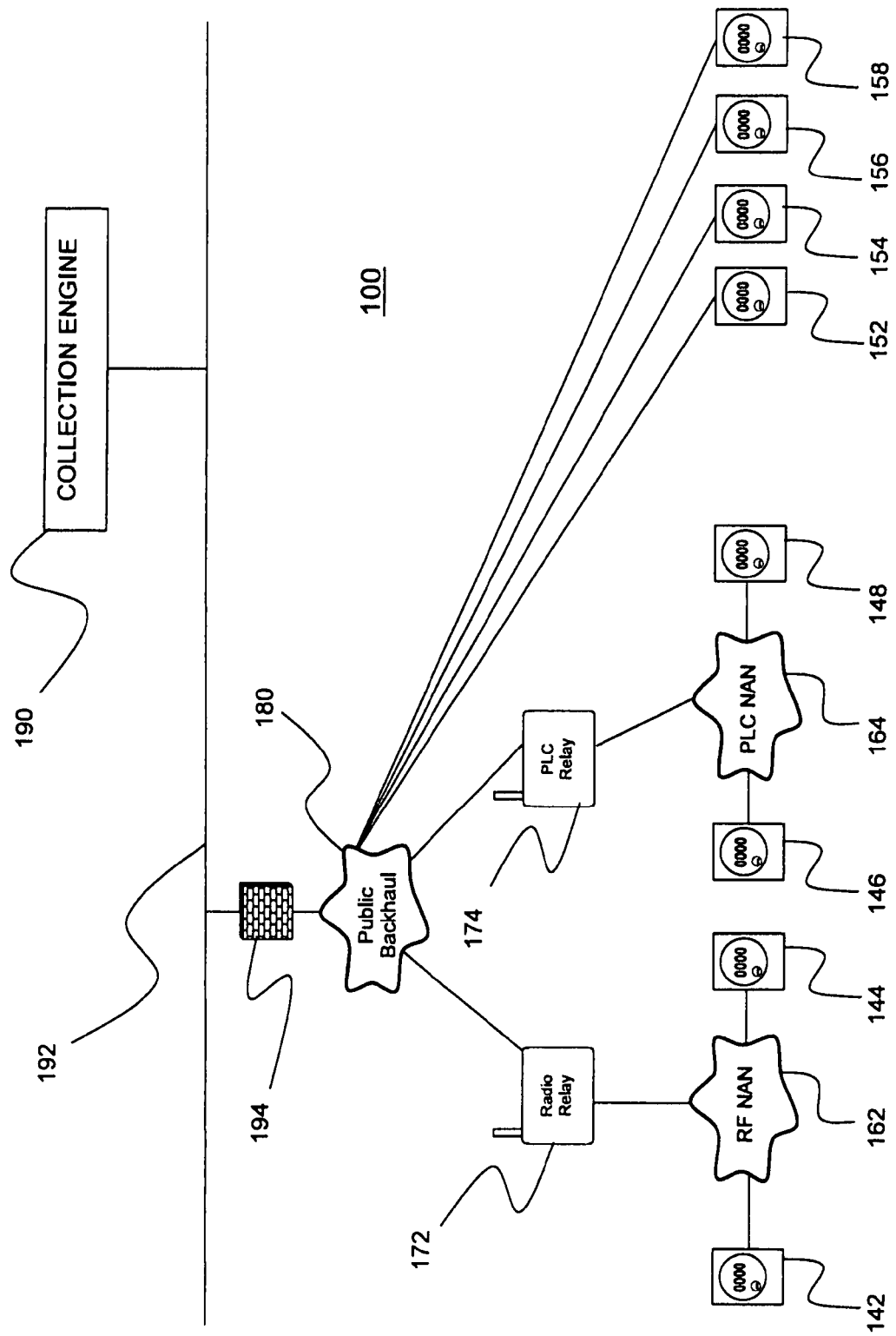
FIG. 1 is a block diagram overview illustration of an Advanced Metering System (AMS) in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with an improved apparatus and methodologies for controlling the allocation of system nodes to a variable number of communication servers, so as to advantageously provide system scalability and redundancy.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject firmware download methodologies and apparatus. Referring now to the drawings, FIG. 1 is a block diagram overview illustration of an Advanced Metering System (AMS) generally 100 in accordance with the present subject matter.

Advanced Metering System (AMS) 100 in accordance with the present subject matter is designed to be a comprehensive system for providing advanced metering information and applications to utilities. AMS 100 is build around industry standard protocols and transports, and is designed to work with standards compliant components from third parties.

Major components of AMS 100 include such as exemplary respective meters 142, 144, 146, 148, 152, 154, 156, and 158; one or more radio networks including RF neighborhood area network (RF NAN) 162 and accompanying Radio Relay 172, and power line communications neighborhood area network (PLC NAN) 164 and accompanying PLC Relay 174; an IP (Internet Protocol) based Public Backhaul 180; and a Collection Engine 190. Other components within AMS 100 include a utility LAN 192 and firewall 194 through which communications signals to and from Collection Engine 190 may be transported from and to respective meters 142, 144, 146, 148, 152, 154, 156, and 158 or other devices including, but not limited to, Radio Relay 172 and PLC Relay 174.

AMS 100 is configured to be transparent in a transportation context, such that exemplary respective meters 142, 144, 146, 148, 152, 154, 156, and 158 may be interrogated using Collection Engine 190 regardless of what network infrastructure exists inbetween or among such components. Moreover, due to such transparency, the meters may also respond to Collection Engine 190 in the same manner.

As represented by the illustration in FIG. 1, Collection Engine 190 is capable of integrating Radio, PLC, and IP connected meters. To facilitate such transparency, AMS 100 operates and/or interfaces with ANSI standard C12.22 meter communication protocol for networks. C12.22 is a network transparent protocol, which allows communications across disparate and asymmetrical network substrates. C12.22 details all aspects of communications, allowing C12.22 compliant meters produced by third parties to be integrated into a single advanced metering interface (AMI) solution. AMS 100 is configured to provide meter reading as well as load control/demand response, in home messaging, and outage and restoration capabilities. All data flowing across the system is sent in the form of C12.19 tables. The system provides full two-way messaging to every device; however, many of its functions may be provided through broadcast or multicast messaging and session-less communications.

Figure 2:
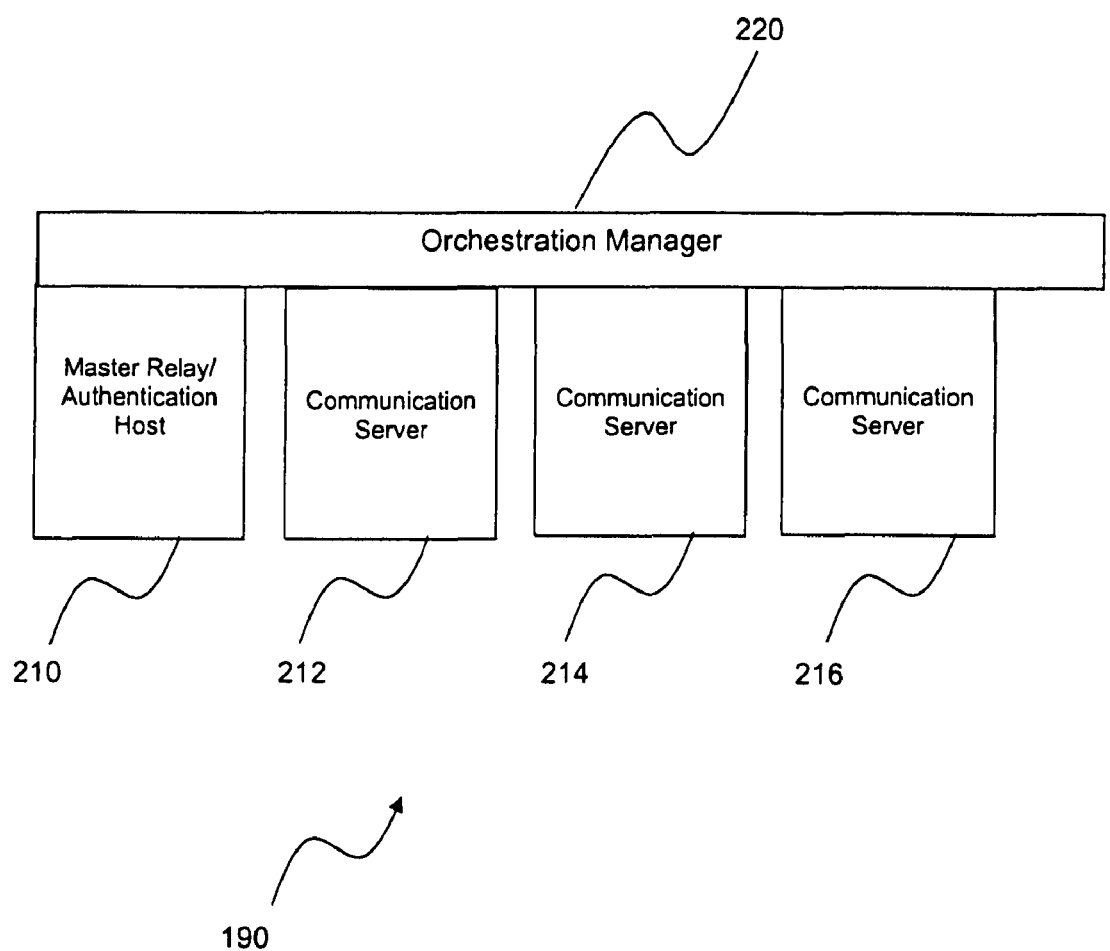
FIG. 2 illustrates a block diagram of the components of a Collection Engine in accordance with an exemplary embodiment of the present subject matter.

With reference now to FIG. 2, there is illustrated a block diagram representation of components of Collection Engine 190 in accordance with an exemplary embodiment of the present subject matter. Collection Engine 190 is a collection of software-based functionality which provides ANSI C12.22 services to the devices that comprise the C12.22 network, including one or more cell relays 172, 174 (FIG. 1) as well as the metrology and end devices 142, 144, 146, 148, 152, 154, 156, and 158 (FIG. 1). Though such components are preferably software-based, those of ordinary skill in the art will appreciate various equivalent forms of implementation, providing the same functionality. Conceptually, the Collection Engine 190 is comprised of three major components, the Orchestration System or Manager generally 220, the Master Relay/Authentication host 210, and the communications server or servers (represented by illustrated components 212, 214, and 216). Collection Engine 190 is implemented preferably so as to be able to distribute work across multiple servers 212, 214, and 216 in order to facilitate scaling.

Orchestration Manager 220 controls the allocation of C12.22 nodes to a variable number of communication servers. Multiple communication servers 212, 214, and 216 may be advantageously used per the present subject matter in conjunction with providing scalability and redundancy. For example, an allocation algorithm per present subject matter may provide load balancing in the Collection Engine 190. Load balancing affects two aspects of data collection: contacting end devices to read data, and receiving exception reports from end devices. Rebalancing functionality per the present subject matter is periodically operative to reallocate system nodes among communication servers, thereby maintaining efficiency of data collection. Such rebalancing functionality also advantageously redistributes end devices from a failed communication server to the other active servers, and/or to a communication server that becomes active. All requests for end-device communications are routed through Orchestration Manager 220. A job system is used to organize and track actions currently in progress on communication servers 212, 214, and 216; to pass large-scale interrogation parameters to such communication servers; to receive status from such communication servers; and in case of failure, to provide persistence of Collection Engine state information over to a backup Orchestration Manager or communication server (not presently illustrated). In its role as a C12.22 Notification Host, Orchestration Manager 220 generally coordinates registration-related processing on communication servers 212, 214, and 216.

Within a C12.22 system, the Master Relay 210 is the coordinating process for the overall system. More specifically, in order to send or receive C12.22 messages, respective nodes must be registered with the Master Relay 210. Before a node is allowed to register though, it must be authenticated. The Authentication Host provides such functionality in the present exemplary embodiment. The Master Relay or station 210 is responsible for the actual meter registration process, communicating with the meter via C12.22 messages.

As will be understood by those of ordinary skill in the art, each of the respective major components of Collection Engine 190 is in turn made up of a series of smaller components and functionality feature sets. The Orchestration Manager or layer 220 provides coordination between such components, and presents a unified, single API (Application Programming Interface) to upstream systems. The Orchestration Manager or system 220 runs as a single master orchestration service (or functionality) and as a series of agents. Each separate physical server will have an orchestration agent to tie it into the larger system. API requests are directed to a master orchestration service (or functionality) which in turn works with the orchestration agents to ensure that requested work or methodology is performed or executed.

The Master Relay/Authentication Host 210 will provide standard C12.22 registration services/functionality as well as integrated C12.22 network authentication functionality/services. One vision for the C12.22 protocol is that, similar to DNS (Domain Name System), a C12.22 master relay may be created which would be shared between multiple utilities, perhaps providing services to an entire region or country. With such approach in mind, implementation of a master relay in accordance with present technology should provide full support for the use of other authentication hosts, and for sending notification messages to registered hosts. Additionally, the Orchestration Manager or layer 220 is preferably implemented so as to be able to receive notifications from master relays from other manufacturers, meaning that an implementation of the present subject matter could be realized employing a master relay from an outside source.

The representative Communications Servers 212, 214, and 216 provide communication functionality with devices, such as to parse and translate such communications, and post or return data as necessary. Communication Servers 212, 214, and 216 thus preferably may comprise a series of services/functionality to accomplish such overall functionality per the present subject matter. Within Communications Servers 212, 214, and 216 are a series of major components: a meter communications host, a data spooler, and an exception event manager. The meter communications host is responsible for listening for network communications and sending network communications. It is the component that both "speaks" C12.22 and "interprets" C12.19 table data. The data spooler and the exception event manager provide mechanisms for streaming meter data and exception events, respectively, to upstream systems.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An orchestration manager for distributing utility meter data communications functionality across multiple servers, comprising: a master relay configured to register and authenticate multiple communication nodes associated with one or more respective utility meters; and a plurality of communication servers comprising respective processors and associated memories configured to communicate with at least a selected portion of said multiple communication nodes, each communication server configured to send and receive network communications and to acquire meter data from said multiple communications nodes, wherein said master relay is further configured to: periodically assign balanced communication functionality associated with said multiple communication nodes to said plurality of communication servers, redistribute communication nodes from a failed communication server to an active one of said plurality of communication servers so as to periodically effect load rebalancing among said plurality of communication servers, and copy to another location state information for the one or more respective meters associated with respective communication nodes previously communicating with a failed communication server.

2. An orchestration manager as in claim 1, wherein each said communication server comprises:
    a meter communications host configured to send and receive network communications;
    a data spooler configured to receive meter data from respective utility meters associated with a communication node; and
    an exception event manager configured to receive exception events from respective utility meters associated with a communication node.

3. An orchestration manager as in claim 2, wherein said meter communications host is configured to communicate in accordance with an open standard meter communication protocol.

4. An orchestration manager as in claim 1, wherein said multiple communication nodes associated with one or more respective utility meters comprise at least one communication node operating on a radio network and at least one communication node operating on a power line communications (PLC) network.

5. An orchestration manager as in claim 1, wherein said master relay is configured to receive communications in accordance with an open standard meter communication protocol from said multiple communication nodes.

6. An orchestration manager as in claim 1, further comprising a job system configured to organize and track actions currently in progress on said plurality of communication servers.

7. An orchestration manager as in claim 1, wherein said master relay comprises a software-based application programming interface.

8. A method of controlling allocation of network nodes in a utility metering environment to a variable number of servers, so as to effect efficient utility meter data communications, the method comprising the steps of:
    identifying a plurality of communication nodes, each communication node being associated with one or more respective utility meters;
    periodically assigning to respective selected servers balanced communication functionality associated with respective selected portions of the plurality of communication nodes;
    effecting two-way communication between each selected portion of the plurality of communication nodes and its respective assigned server, wherein such two-way communication is conducted in accordance with an open standard meter communication protocol;
    receiving meter data from respective utility meters associated with each communication node;
    receiving exception event data from respective utility meters associated with each communication node; and
    upon receiving exception event data indicating failure of one or more of the servers, redistributing communication nodes from being assigned to a failed server to being assigned to an active one of the plurality of servers, so as to periodically effect load rebalancing among said plurality of communication servers.

9. A method as in claim 8, further comprising a step of copying to another location state information for the one or more respective meters associated with respective communication nodes previously communicating with a failed server.

10. A method as in claim 8, further comprising a step of tracking actions currently in progress on the plurality of servers.

11. A method as in claim 8, further comprising a step of registering and authenticating each of the plurality of communication nodes.

12. An advanced metering system for controlling allocation of network nodes in a utility metering environment to a variable number of servers, so as to effect efficient utility meter data communications, comprising:
    a plurality of end devices, at least some of which end devices comprise metrology devices; and
    a network including a central facility having a collection engine including an orchestration manager for periodically distributing balanced metrology device data communications functionality across multiple servers;
    wherein said orchestration manager comprises:
        a master relay configured to register and authenticate multiple communication nodes associated with one or more respective utility meters and to assign communication functionality associated with said multiple communication nodes to a plurality of communication servers; and
        a plurality of communication servers configured to communicate with at least a selected portion of said multiple communication nodes, each communication server configured to send and receive network communications and to acquire meter data from said multiple communications nodes; and
    wherein said master relay is configured to receive communications in accordance with an open standard meter communication protocol from said multiple communication nodes; to periodically assign communication functionality associated with said multiple communication nodes to said plurality of communication servers, so as to periodically effect load rebalancing among said plurality of communication servers; to redistribute communication nodes from a failed communication server to an active one of said plurality of communication servers; and to copy to another location state information for the one or more respective meters associated with respective communication nodes previously communicating with a failed communication server.

13. An advanced metering system as in claim 12, wherein each said communication server comprises:
    a meter communications host configured to send and receive network communications in accordance with an open standard meter communication protocol;
    a data spooler configured to receive meter data from respective utility meters associated with a communication node; and
    an exception event manager configured to receive exception events from respective utility meters associated with a communication node.

14. An advanced metering system as in claim 12, wherein said multiple communication nodes associated with one or more respective utility meters comprise at least one communication node operating on a radio network and at least one communication node operating on a power line communications (PLC) network.

15. An advanced metering system as in claim 12, wherein said orchestration manager further includes a job system configured to organize and track actions currently in progress on said plurality of communication servers.

16. An advanced metering system as in claim 12, wherein said master relay comprises a software-based application programming interface.

* * * * *